united States Patent  US 9,193,249 B2
Sawada  Nov. 24, 2015

(54) ROOF APPARATUS (71) Applicant: AISIN SEIKI KABUSHIKI KAISHA, Kariya-shi, Aichi-ken (JP)

(72) Inventor: Kazuki Sawada, Handa (JP)

(73) Assignee: Aisin Seiki Kabushiki Kaisha, Kariya-shi, Aichi-ken (JP)

(*) Notice: Subject to any disclaimer, the term of this patent is extended or adjusted under 35 U.S.C. 154(b) by 0 days.

(21) Appl. No.: 14/487,164

(22) Filed: Sep. 16, 2014

(65) Prior Publication Data
US 2015/0076868 A1 Mar. 19, 2015

(30) Foreign Application Priority Data

Sep. 17, 2013 (JP) ................................. 2013-192091

(51) Int. Cl.
B60J 10/10 (2006.01)
B60J 10/12 (2006.01)
B60J 10/00 (2006.01)
B60J 7/043 (2006.01)

(52) U.S. Cl.
CPC ............ *B60J 10/0091* (2013.01); *B60J 7/0435* (2013.01); *B60J 10/0017* (2013.01); *B60J 10/12* (2013.01)

(58) Field of Classification Search
CPC ...... B60J 10/12; B60J 10/002; B60J 10/0091; B60J 10/0017; B60J 7/0435
USPC ........................................ 296/216.06–216.09
See application file for complete search history.

(56) References Cited

U.S. PATENT DOCUMENTS 2,547,799 A * 4/1951 Wernig ...................... 296/96.21
5,083,832 A * 1/1992 Ohya .......................... 296/146.2
5,566,510 A * 10/1996 Hollingshead et al. ....... 49/479.1
6,802,666 B1 * 10/2004 Bormann et al. ............. 403/233
8,152,229 B2 4/2012 Horiuchi et al.
8,388,053 B2 3/2013 Kikuchi et al.
2002/0104276 A1 8/2002 Lucas, Jr. et al.

FOREIGN PATENT DOCUMENTS

DE 10345855 A1 5/2005
JP 2010-95129 4/2010
JP 2012-96766 5/2012

OTHER PUBLICATIONS

Search Report issued by the European Patent Office for Application No. EP 14184881.2 dated Mar. 2, 2015.

* cited by examiner

*Primary Examiner* — Dennis H Pedder
(74) *Attorney, Agent, or Firm* — Finnegan, Henderson, Farabow, Garrett & Dunner, LLP (57) ABSTRACT A roof apparatus includes plural panels including a first panel for opening and closing an opening, and a second panel being positioned at a front or a rear of a vehicle and next to the first panel, the second panel being fixed to establish a state where the opening is closed. The roof apparatus further includes a weather strip including a weather strip body being attached to an entire periphery of the opening of a roof, the weather strip body sealing a portion between an opening rim of the opening and a peripheral rim formed by the plural panels, a border weather strip attached to the second panel and sealing a border portion between the first panel and the second panel, and a connection portion integrally connecting the weather strip body and each opposing end of the border weather strip in a vehicle width direction.

16 Claims, 7 Drawing Sheets

ROOF APPARATUS

CROSS REFERENCE TO RELATED APPLICATIONS

This application is based on and claims priority under 35 U.S.C. §119 to Japanese Patent Application 2013-192091, filed on Sep. 17, 2013, the entire content of which is incorporated herein by reference.

TECHNICAL FIELD

This disclosure generally relates to a roof apparatus.

BACKGROUND DISCUSSION

Figure 11:
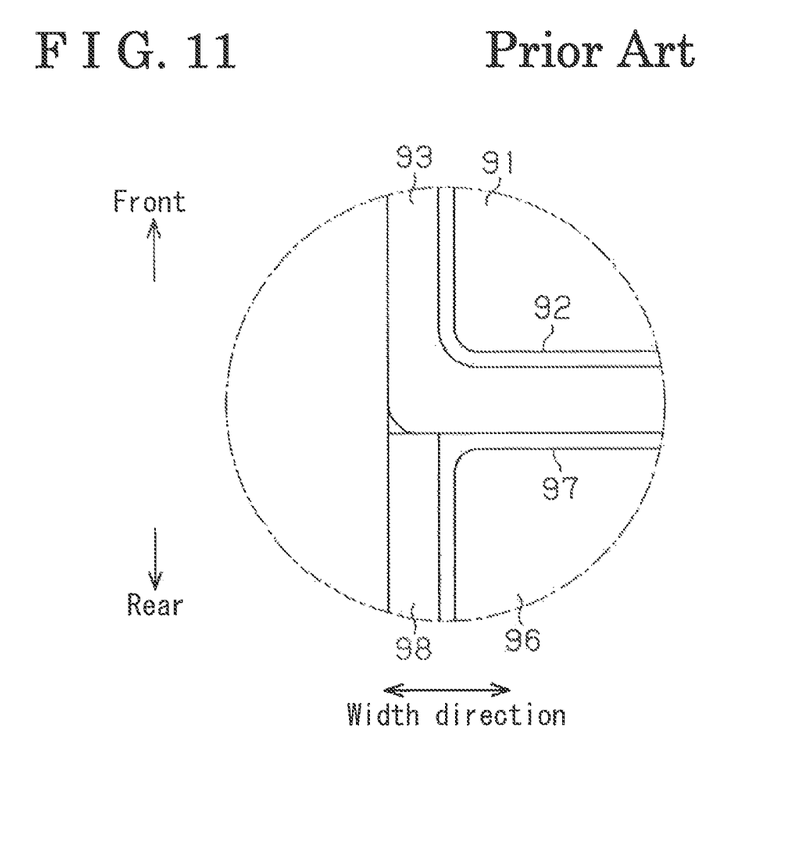
FIG. 11 is a plan view illustrating a known construction of a roof apparatus.

A known roof apparatus is disclosed in JP2010-95129A (hereinafter referred to as Patent reference 1). The roof apparatus disclosed in Patent reference 1 includes plural panels which cover an opening formed at a roof of a vehicle. As shown in FIG. 11, a panel frame body 92 is provided and fixed to an entire periphery of a rim portion of a front panel 91 which is positioned at a front of the vehicle. A weather strip 93 is attached to an entire periphery of the panel frame body 92.

On the other hand, a panel frame body 97 is provided and fixed to an entire periphery of a rim portion of a rear panel 96 which is positioned at a rear of the vehicle. A weather strip 98 is attached to an entire periphery of the panel frame body 97 except for a front rim portion thereof.

In a state where the front panel 91 and the rear panel 96 are fully closed, the weather strip 93 liquid-tightly contacts an opening rim of the opening closer to a front of the vehicle and a front rim of the panel frame body 97, whereas the weather strip 98 liquid-tightly contacts the opening rim of the opening closer to the rear of the vehicle. As above, a sealing function is assured to an entire periphery of the opening together with a border portion between the front panel 91 and the rear panel 96.

According to the roof apparatus disclosed in Patent reference 1, the sealing is cut at a side portion of the border portion between the front panel 91 and the rear panel 96 because it is difficult to assure the sealing function at a portion between the weather strip 93 and a front rim of the weather strip 98. In those circumstances, for example, the side portion may allow infiltration of rainwater.

Another known roof apparatus is disclosed in JP2012-96766A (hereinafter, referred to as Patent reference 2). According to Patent reference 2, a weather strip is attached to an entire periphery of an opening of a roof. In those circumstances, a sealing function of a border portion between a movable panel which is positioned at a front of a vehicle and a fixed panel which is positioned at a rear of the vehicle is assured by a weather strip attached on a front rim portion of, for example, the fixed panel. As in the case of Patent reference 1, the sealing is cut at a side portion of the border portion.

A need thus exists for a roof apparatus which is not susceptible to the drawback mentioned above.

SUMMARY

According to an aspect of this disclosure, a roof apparatus includes plural panels being positioned next to each other in a vehicle front-rear direction, the plural panels configured to a roof to cover an opening formed on the roof of the vehicle, the plural panels including a first panel for opening and closing the opening, the plural panels including a second panel being positioned at a front or a rear of the vehicle and next to the first panel, the second panel being fixed to establish a state where the opening is closed. The roof apparatus further includes a weather strip including a weather strip body being attached to an entire periphery of the opening of the roof, the weather strip body sealing a portion between an opening rim of the opening and a peripheral rim formed by the plural panels, a border weather strip attached to the second panel at a border portion between the first panel and the second panel which are positioned next to each other, the border weather strip sealing the border portion between the first panel and the second panel, and a connection portion integrally connecting the weather strip body and each opposing end of the border weather strip in a vehicle width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a roof apparatus will be explained with reference to the drawings. Hereinafter, a front-rear direction corresponds to a front-rear direction of a vehicle, and an upward and a downward correspond to an upward and a downward in a vehicle height direction, respectively. A width direction corresponds a width direction of the vehicle. Further, a vehicle inner side corresponds to the inner in a vehicle width direction directed to an inside of a vehicle compartment, and a vehicle outer side corresponds to the outer in the vehicle width direction directed to an outside of the vehicle compartment.

Figure 1:
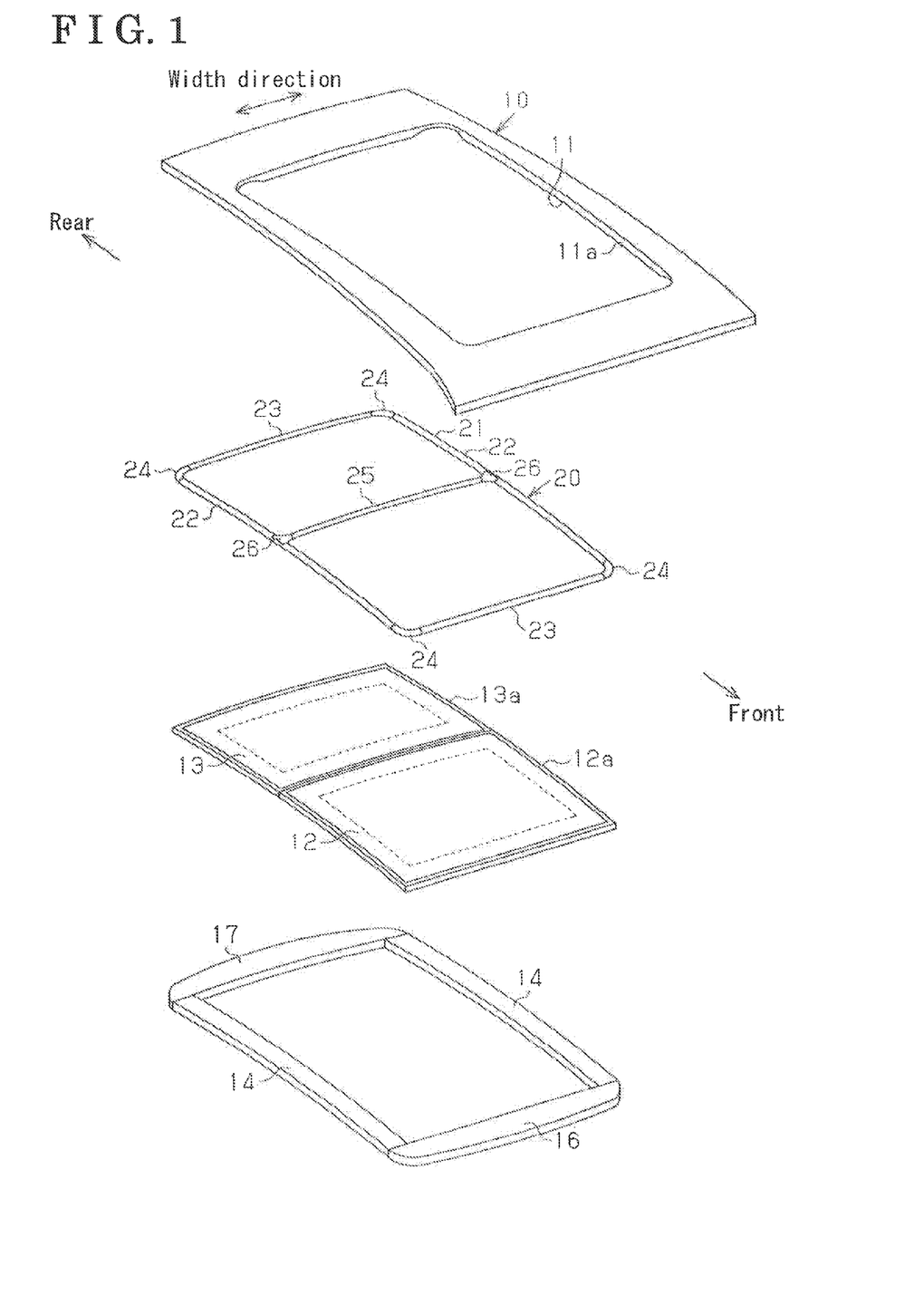
FIG. 1 is an exploded perspective view of a roof apparatus of an embodiment disclosed here.

As shown in FIG. 1, a substantially quadrilateral opening 11 is formed on a roof 10 of a vehicle, for example, an automobile. An opening rim of the opening 11 includes a body-side flange portion 11a which is formed in a substantially quadrilateral tube extending downward of a substantially entire periphery of the opening 11. Further, a movable panel 12 (i.e., serving as a first panel) and a fixed panel 13 (i.e., serving as a second panel) each formed in a substantially quadrilateral configuration and made from, for example, a glass plate are provided next to each other in the front-rear direction at the roof 10. The movable panel 12 serving as a first panel is provided to open and close a front portion of the opening 11. That is, the movable panel 12 is provided to perform a tilt-up operation in which a rear portion of the movable panel 12 is raised with a front portion of the movable panel 12 as a rotation center and a sliding operation in the front-rear direction. An outer sliding type, in which the movable panel 12 slides while maintaining a tilt-up state, is adopted for an opening and closing operation of the front portion of the opening 11. The movable panel 12 includes a first rim portion 12a formed in a substantially quadrilateral loop shape along a peripheral rim portion of the movable panel 12 and is made from, for example, a resin material.

On the other hand, the fixed panel 13 serving as a second panel is attached to always close a rear portion of the opening 11. The fixed panel 13 includes a second rim portion 13a formed in a substantially quadrilateral loop shape along a peripheral rim portion of the fixed panel 13 and is made from, for example, a resin material.

A pair of guide rails 14 extending in the front-rear direction along opposing rim portions of the opening 11 in the width direction is provided at the roof 10. Further, a front housing 16 extends along a front rim portion of the opening 11 and connects each of front ends of the guide rails 14 at the roof 10 in the width direction, whereas a rear housing 17 extends along a rear rim portion of the opening 11 and connects each of rear ends of the guide rails 14 at the roof 10 in the width direction. Each of the guide rails 14 is made from an extruded member, for example, aluminum alloy, whereas the front housing 16 and the rear housing 17 are made from, for example, a resin material.

A pair of function members is movably supported on the opposing guide rails 14 in the front-rear direction. The movable panel 12 is linked and supported on the function members so as to be extended thereover. The movable panel 12 opens and closes in accordance with the movement of the function members in the front-rear direction.

A weather strip 20 is mounted to the roof 10. The weather strip 20 includes a weather strip body 21, a border weather strip 25, and connection portions 26. The weather strip body 21 formed in a substantially quadrilateral loop shape is provided along a peripheral rim portion of the opening 11. The border weather strip 25 extends along a front rim portion of the fixed panel 13 in the width direction. The connection portion 26 made by die forming integrally connects the weather strip body 21 and opposing ends of the border weather strip 25 in the width direction, respectively. The weather strip body 21 includes a pair of side-portion weather strips 22 (i.e., serving as a first side-portion weather strip and a second side-portion weather strip) and a pair of front/rear portion weather strips 23. The pair of side-portion weather strips 22 extends in the front-rear direction along the opposing rim portions of the opening 11 in the width direction. The pair of front/rear portion weather strips 23 extends in the width direction along the opposing rim portions of the opening 11 in the front-rear direction. Front-rear portion weather strips 23 serving as a pair connect to a front end of the side-portion weather strip 22 and to a rear end of the side-portion weather strip 22, respectively, via a corner portion 24 which is made by die forming. Each of the side-portion weather strips 22 is made from an extruded member which has a substantially constant cross section in the front-rear direction, whereas the front-rear portion weather strips 23 and the border weather strip 25 are made from extruded members which have substantially constant cross sections, respectively, in the width direction.

Figure 2:
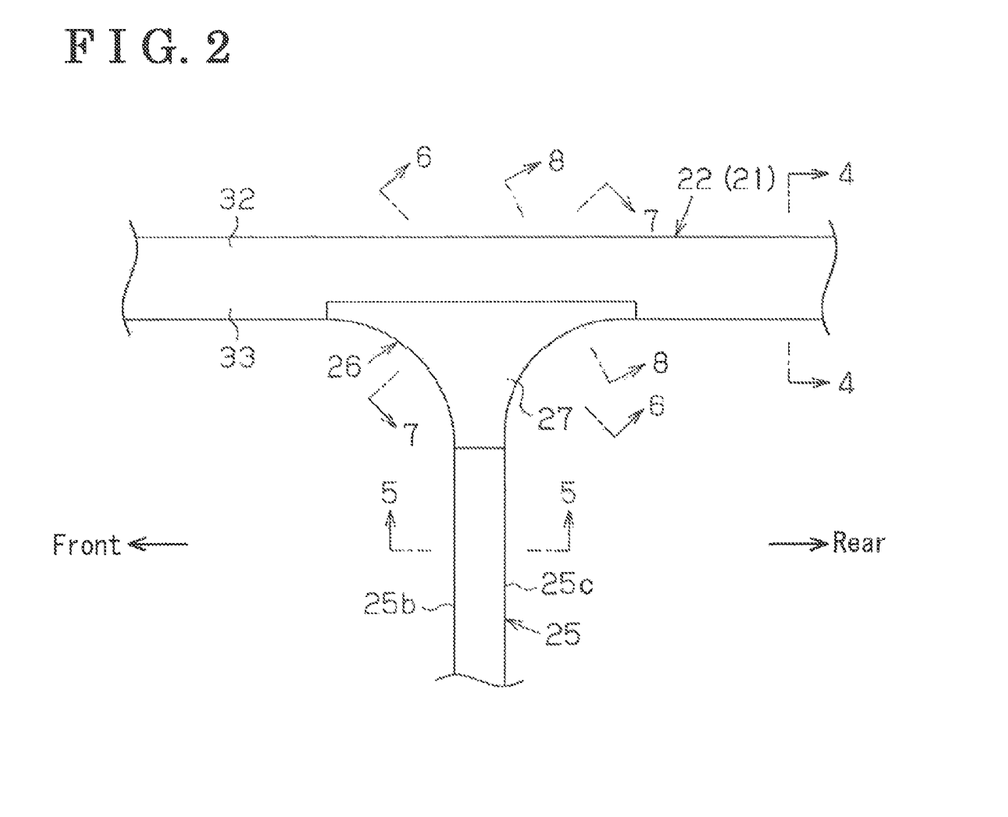
FIG. 2 is a plan view partially illustrating the roof apparatus of the embodiment.
Figure 4:
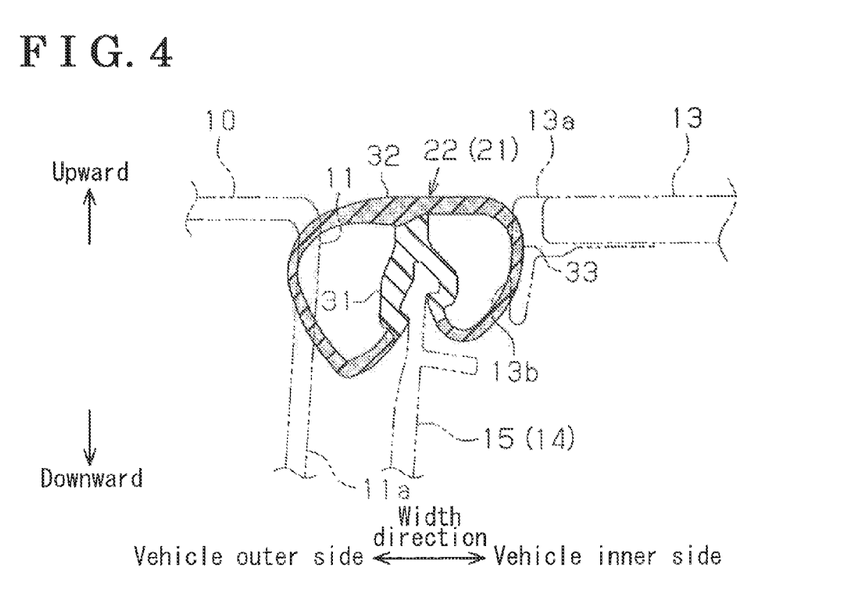
FIG. 4 is a cross-sectional view taken along a line 4-4 shown in FIG. 2.

As shown in FIGS. 2 and 4, each of the side-portion weather strips 22 is attached on the guide rail 14 and seals a portion between the body-side flange portion 11a of the opening 11 and each rim end of the movable panel 12 and the fixed panel 13 at opposing sides in the width direction. That is, the opposing end rims in the width direction and a rear end rim of the second rim portion 13a of the fixed panel 13 include a panel-side flange portion 13b extending downward of the substantially entire length of the second rim portion 13a. Each of the guide rails 14 includes a wall 15 formed in a substantial longitudinal shape and standing upwardly over the substantially entire length in the longitudinal direction of the guide rails 14.

In those circumstances, the side-portion weather strip 22 includes an attachment portion 31, a first seal portion 32, and a second seal portion 33. The attachment portion 31 includes a cross section which is formed in a substantially C-shape and sandwiches and fits an upper portion of the wall 15. The first seal portion 32 is curved to protrude towards the vehicle outer side from the attachment portion 31. The second seal portion 33 is curved to protrude towards the vehicle inner side from the attachment portion 31. The attachment portion 31 is made from a solid material of synthetic rubber, for example, ethylene propylene dien monomer, or EPDM, or of thermoplastic elastomer, whereas the first and second seal portions 32, 33 are made from sponge material of the synthetic rubber, for example, EPDM or of the thermoplastic elastomer.

A first end of the first seal portion 32 is connected to an upper end of the attachment portion 31, whereas a second end of the first seal portion 32 is connected to a lower end of the attachment portion 31 at the vehicle outer side relative to the wall 15. In a free state, the first seal portion 32 is formed to have a substantially bow shape in cross section and protrudes towards the vehicle outer side (i.e., towards the body-side flange portion 11a). The first seal portion 32 formed in a substantially D-shape in a cross section together with the attachment portion 31 elastically deforms, or resiliently reforms so as to overlap with a portion of the body-side flange portion 11a in the vehicle height direction and liquid-tightly contacts therewith.

On the other hand, a first end of the second seal portion 33 is connected to the upper end of the attachment portion 31, whereas a second end of the second seal portion 33 is connected to the lower end of the attachment portion 31 at the vehicle inner side relative to the wall 15. In a free state, the second seal portion 33 is formed to have a substantially bow shape in cross section and protrudes towards the vehicle inner side (i.e., towards the panel-side flange portion 13b). The second seal portion 33 formed in a substantially D-shape in a cross section together with the attachment portion 31 elastically deforms, or resiliently reforms so as to overlap with a portion of the panel-side flange portion 13b in the vehicle height direction and liquid-tightly contacts therewith.

Figure 7:
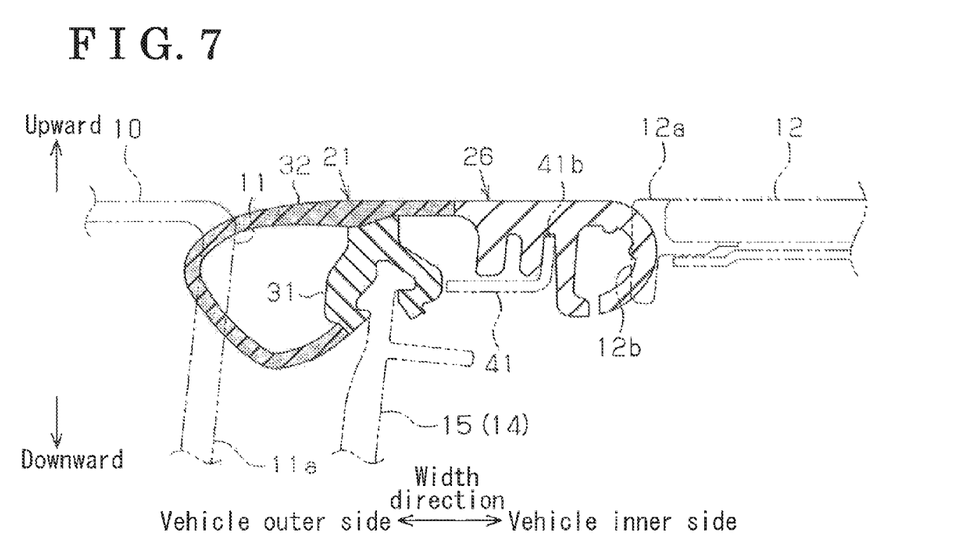
FIG. 7 is a cross-sectional view taken along a line 7-7 shown in FIG. 2.

As shown in FIG. 7, opposing end rims in the width direction and a front end rim of the first rim portion 12a of the movable panel 12 include a panel-side flange portion 12b extending downward of the substantially entire length of the first rim portion 12a. The second seal portion 33 elastically deforms, or resiliently reforms so as to overlap with a portion of the panel-side flange portion 12b of the fully-closed movable panel 12 in the vehicle height direction and liquid-tightly contacts therewith.

The front housing 16 is provided with a mounted wall which is similar to the wall 15, whereas the front-rear portion weather strip 23 positioned at the front of the vehicle is provided with an attachment portion, a first seal portion and a second seal portion which are similar to the attachment portion 31, the first seal portion 32, and the second seal portion 33. Thus, the front-rear weather strip 23 includes the attachment portion which sandwiches and fits an upper portion of the mounted wall of the front housing 16. The first seal portion liquid-tightly contacts the body-side flange portion 11a, whereas the second seal portion liquid-tightly contacts the panel-side flange portion 12b of the fully-closed movable panel 12.

The rear housing 17 is provided with a mounted wall which is similar to the wall 15, whereas the front-rear portion weather strip 23 positioned at the rear of the vehicle is provided with an attachment portion, a first seal portion and a second seal portion which are similar to the attachment portion 31, the first seal portion 32, and the second seal portion 33. Thus, the front-rear weather strip 23 includes the attachment portion which sandwiches and fits an upper portion of the mounted wall of the rear housing 17. The first seal portion liquid-tightly contacts the body-side flange portion 11a, whereas the second seal portion liquid-tightly contacts the panel-side flange portion 13b of the fixed panel 13.

Figure 5:
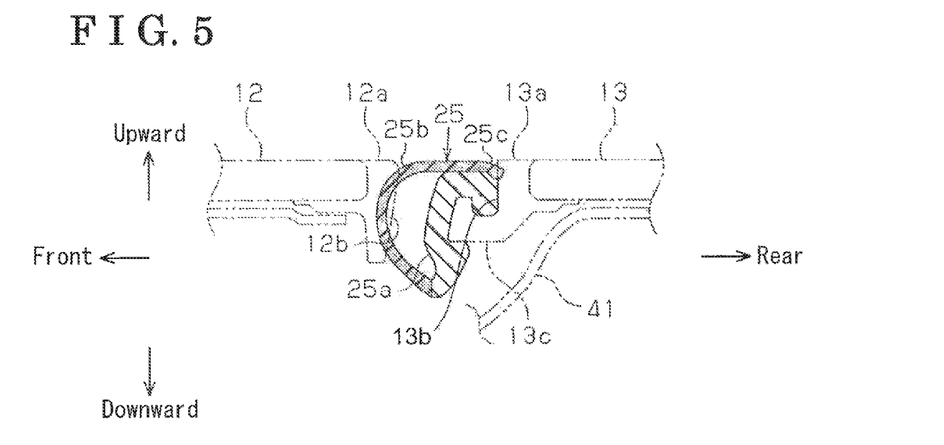
FIG. 5 is a cross-sectional view taken along a line 5-5 shown in FIG. 2.

The border weather strip 25 is attached to the front rim portion of the fixed panel 13 and seals a border portion (clearance) between the fully-closed movable panel 12 and the fixed panel 13. That is, as shown in FIG. 5, a panel-side engagement protrusion 13c formed in a substantially hooked shape in cross section is positioned at the front end rim of the second rim portion 13a of the fixed panel 13 and protrudes from a lower portion toward the front of the vehicle.

On the other hand, a seal-side engagement protrusion 25a serving as a panel attachment portion formed in a substantially hooked shape in cross section protrudes from an upper portion towards the rear of the vehicle so as to engage with, from different directions, the panel-side engagement protrusion 13c of the fixed panel 13 which protrudes from a lower portion towards the front of the vehicle. The border weather strip 25 includes a third seal portion 25b and a fourth seal portion 25c. The third seal portion 25b is curved to protrude from the seal-side engagement protrusion 25a to the front of the vehicle. The fourth seal portion 25c protrudes from the seal-side engagement protrusion 25a to the rear of the vehicle. The seal-side engagement protrusion 25a is made from a solid material of synthetic rubber, for example, EPDM, or of thermoplastic elastomer, whereas the third and fourth seal portions 25b, 25c are made from sponge material of the synthetic rubber, for example, EPDM or of the thermoplastic elastomer.

A first end of the third seal portion 25b is connected to an upper end of the seal-side engagement protrusion 25a, whereas a second end of the third seal portion 25b is connected a lower end of the seal-side engagement protrusion 25a. In a free state, the third seal portion 25b is formed to have a substantially bow shape in cross section and protrudes towards the front of the vehicle (i.e., towards the panel-side flange portion 12b of the movable panel 12). The third seal portion 25b is formed in a substantially D-shape in a hollow cross section together with the seal-side engagement protrusion 25a and elastically deforms, or resiliently reforms so as to overlap with a portion of the panel-side flange portion 12b in the vehicle height direction and liquid-tightly contacts therewith. On the other hand, a first end of the fourth seal portion 25c is cantilevered and connected to the upper end of the seal-side engagement protrusion 25a. In a free state, the fourth seal portion 25c is formed in a substantially lip shape in cross section and extends towards the rear of the vehicle (i.e., towards the second rim portion 13a of the fixed panel 13). That is, the fourth seal portion 25c includes a non-hollow cross section together with the seal-side engagement protrusion 25a and liquid-tightly contacts the panel-side flange portion 13b.

Each of the connection portions 26 is made from the synthetic rubber, for example, EPDM or from the thermoplastic elastomer, and as shown in FIG. 2, the connection portion 26 is formed in a substantially T shape in a plan view extending to be gradually wider towards the vehicle outer side. An end of the connection portion 26 positioned at the vehicle outer side is connected to the second seal portion 33 so as to be replaced with a portion of the second seal portion 33, the portion including an entire length of the border weather strip 25 in the front-rear direction. An end of the connection portion 26 positioned at the vehicle inner side is connected to an end of the border weather strip 25. The connection portion 26 faces and comes close contact with the first rim portion 12a of the fully-closed movable panel 12 at the front side portion while facing and coming close contact with the second rim portion 13a of the fixed panel 13 at the rear side portion.

Figure 3:
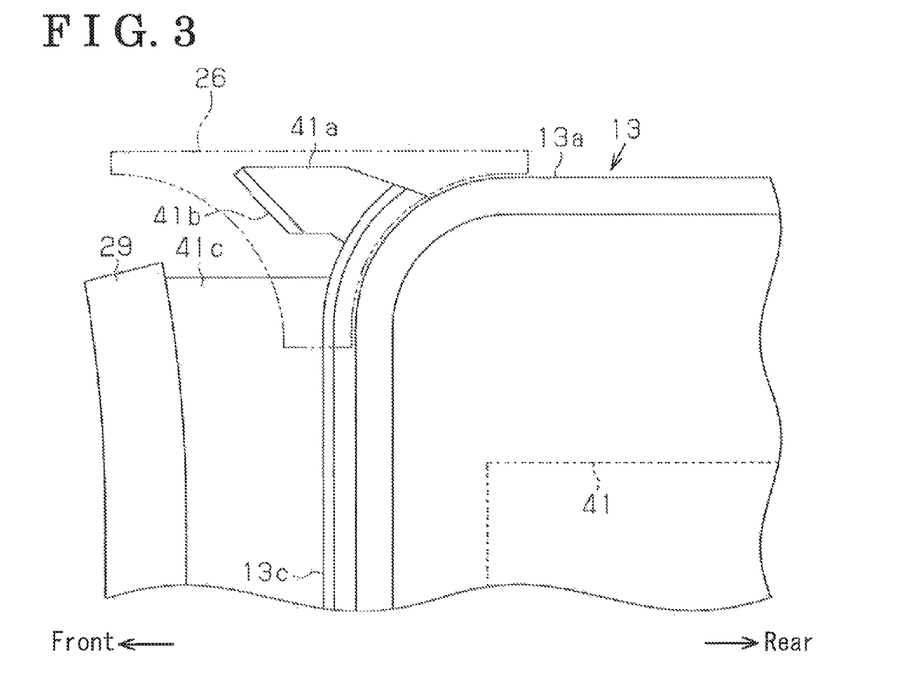
FIG. 3 is a plan view partially illustrating a fixed panel of the roof apparatus.
Figure 6:
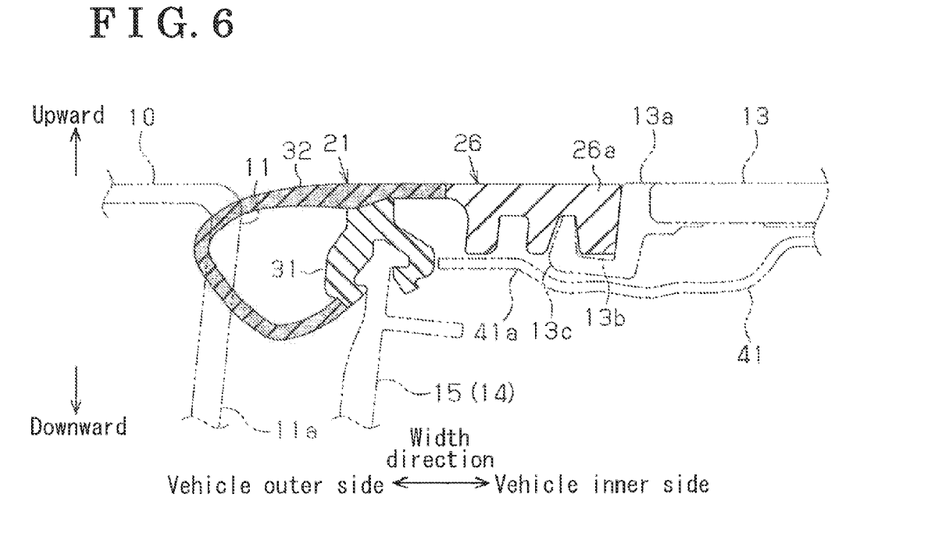
FIG. 6 is a cross-sectional view taken along a line 6-6 shown in FIG. 2.

Each of the connection portions 26 is supported by the fixed panel 13. That is, as shown in FIG. 3, the fixed panel 13 includes a substantially quadrilateral frame-shaped base panel 41 which is made from a steel plate and is positioned downwardly along the peripheral rim portion. The base panel 41 fixes the fixed panel 13 to the roof 10. Further, as shown in FIG. 6 in addition to FIG. 3, the base panel 41 includes a support wall portion 41a positioned at a corner portion of the second rim portion 13a which faces the connection portion 26 and extending toward the front of the vehicle relative to the second rim portion 13a. The connection portion 26 is mounted on the support wall portion 41a.

The connection portion 26 includes an engagement protrusion 26a formed in a substantially hooked shape in cross section, protruding from the vehicle outer side to downward and engaging with, from different directions, the panel-side engagement protrusion 13c of the fixed panel 13 protruding from the vehicle inner side to upward at a corner portion of the second rim portion 13a which faces the connection portion 26. The connection portion 26 is fixed to the fixed panel 13 by engaging the engagement protrusion 26a with the panel-side engagement protrusion 13c.

As shown in FIG. 3, the base panel 41 includes a receiving portion 41b which is formed in a pawl shape and stands upwardly from the end of the support wall portion 41a. The receiving portion 41b is curved to have a substantially bow shape along the front side portion of the connection portion 26 where the first rim portion 12a of the fully-closed movable panel 12 comes in close contact therewith. As shown in FIG. 7, the receiving portion 41b is positioned within the connection portion 26 and receives a reaction force which is applied to the connection portion 26 from the movable panel 12, for example, for stabilizing a posture of the connection portion 26 when being elastically deformed. That is, the position of the connection portion 26 is defined by the rim portions 12a, 13a of the movable panel 12 and the fixed panel 13, respectively, and the base panel 41. Accordingly, the sealing function between the movable panel 12 and the fixed panel 13 is assured.

As shown in FIG. 3, the base panel 41 includes an extending wall portion 41c which is placed at a position being interposed by the opposing support wall portions 41a in the width direction and extends towards the front of the vehicle. A substantially band-shaped up-down seal portion 29 which is made from synthetic rubber, for example, EPDM or from thermoplastic elastomer is fixed to a front end portion of the extending wall portion 41c. An upper end portion of the up-down seal portion 29 liquid-tightly contacts the bottom surface of the fully-closed movable panel 12. Alternatively, the up-down seal portion 29 may be integrally formed with the border weather strip 25.

Figure 8:
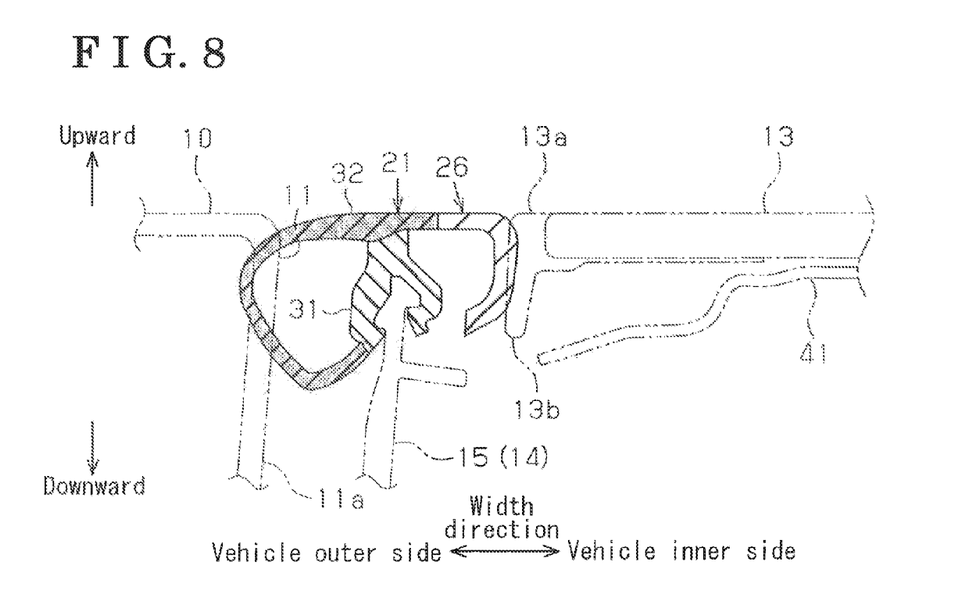
FIG. 8 is a cross-sectional view taken along a line 8-8 shown in FIG. 2.

As described above, the second seal portion 33 of the side-portion weather strip 22 forms a hollow cross section together with the attachment portion 31, whereas the fourth seal portion 25c of the border weather strip 25 forms a non-hollow cross section together with the seal-side engagement protrusion 25a. As shown in FIG. 2, the rear side portion of the connection portion 26 includes a gradually changed portion 27 whose cross-sectional shape is gradually changed from the hollow cross-sectional shape formed by the second seal portion 33 to the non-hollow cross-sectional shape formed by the fourth seal portion 25c, and vice versa as shown a change from FIG. 8 to FIG. 6. Accordingly, the cross section of the second seal portion 33 is prevented from being changed sharply at the connection portion 26.

Next, the operation of the roof apparatus according to the embodiment will be explained. According to the embodiment, when the movable panel 12 is in a fully-closed state, a portion between the panel-side flange portion 12b of the movable panel 12 and the body-side flange portion 11a of the opening 11, and the border portion between the movable panel 12 and the fixed panel 13 are sealed by the single weather strip 20, that is, the front portion of the weather strip body 21, the border weather strip 25 and each of the connection portions 26 over the entire periphery of the movable panel 12. That is, the movable panel 12 covers and comes close contact with the single opening 11 formed at the front portion of the weather strip 20. Similarly, regarding the fixed panel 13, a portion between the panel-side flange portion 13b of the fixed panel 13 and the body-side flange portion 11a of the opening 11, and the border portion between the fixed panel 13 and the movable panel 12 are sealed by the single weather strip 20, that is, the rear portion of the weather strip body 21, the border weather strip 25 and each of the connection portions 26 over the entire periphery of the fixed panel 13. That is, the fixed panel 13 covers and comes close contact with the single opening 11 formed at the rear portion of the weather strip 20. Thus, the sealing of the entire periphery of the opening 11 including the border portion between the movable panel 12 and the fixed panel 13 is prevented from being cut. Accordingly, the leakage of water and air by the opening 11 is prevented.

In the opening and closing operation of the movable panel 12, a part of the function members protrudes upward from a portion between the panel-side flange portion 12b and the side-portion weather strip 22. In the moving range of the function members for opening and closing the movable panel 12, the portion protruding upward is set not to reach the border weather strip 25.

As explained above, according to the embodiment, the following effects and advantages can be attained. According to the embodiment, the sealing of the entire periphery of the opening 11 including the border portion between the movable panel 12 and the fixed panel 13 is prevented from being cut.

According to the embodiment, the connection portion 26 connects the side-portion weather strip 22 and the end of the border weather strip 25 while leaving the first seal portion 32. Accordingly, the cross-sectional shape of the first seal portion 32 may be maintained when being positioned at the connection portion 26 and may prevent the sharp variance of the sealing performance between the first seal portion 32 and the body-side flange portion 11a.

According to the embodiment, the connection portion 26 connects the side-portion weather strip 22 and the end of the border weather strip 25 while leaving the attachment portion 31 in addition to the first seal portion 32. Accordingly, the cross-sectional shapes of the attachment portion 31 in addition to the first seal portion 32 may be maintained when being positioned at the connection portion 26 and may prevent the sharp variance of the sealing performance between the first seal portion 32 and the body-side flange portion 11a.

According to the embodiment, the connection portion 26 includes the gradually changed portion 27 whose cross-sectional shape is gradually changed from the cross-sectional shape of the border weather strip 25 and the cross-sectional shape of at least the second seal portion 33 and vice versa. Thus, the cross-sectional shape of the second seal portion 33 is prevented from being changed sharply. Accordingly, the sealing performance between the second seal portion 33 and the panel-side flange portion 13b of the fixed panel 13 may be prevented from being changed sharply.

According to the embodiment, the cross-sectional shape of the gradually changed portion 27 is gradually changed from the hollow cross-section formed by the second seal portion 33 to the non-hollow cross-section formed by the fourth seal portion 25c and vice versa. Accordingly, the gradually changed portion 27 smoothly connects the second seal portion 33 and the fourth seal portion 25c which include different cross-sectional shapes from each other.

According to the embodiment, because the receiving portion 41b which is the part of the metal-made base panel 41 receives the reaction force applied to the connection portion 26 from the fully-closed movable panel 12, the sealing performance may not be degraded due to, for example, the instability of the posture of the connection portion 26 when elastically deformed. Especially, because the base panel 41 is made of metal, sufficient support strength may be assured when positioning the receiving portion 41b by extending the support wall portion 41a.

Figure 9:
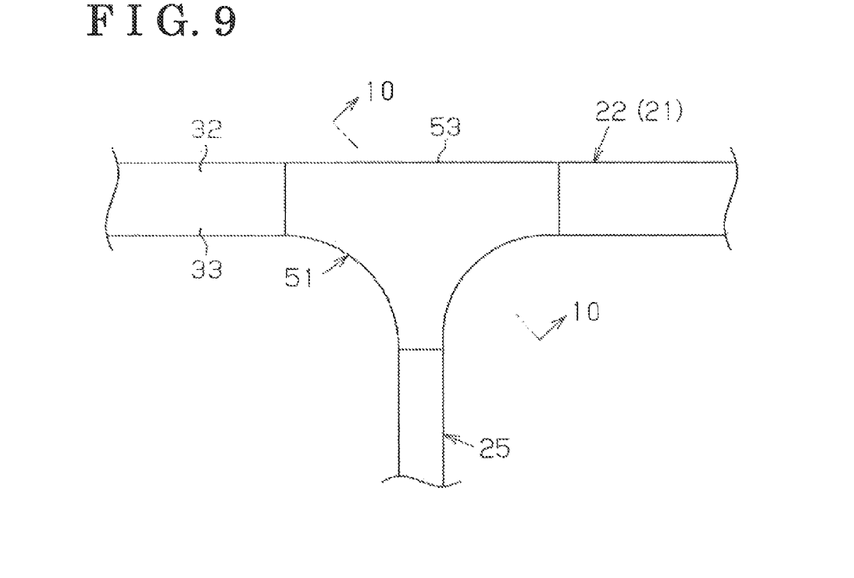
FIG. 9 is a plan view of a modified example of the roof apparatus according to the embodiment disclosed here.
Figure 10:
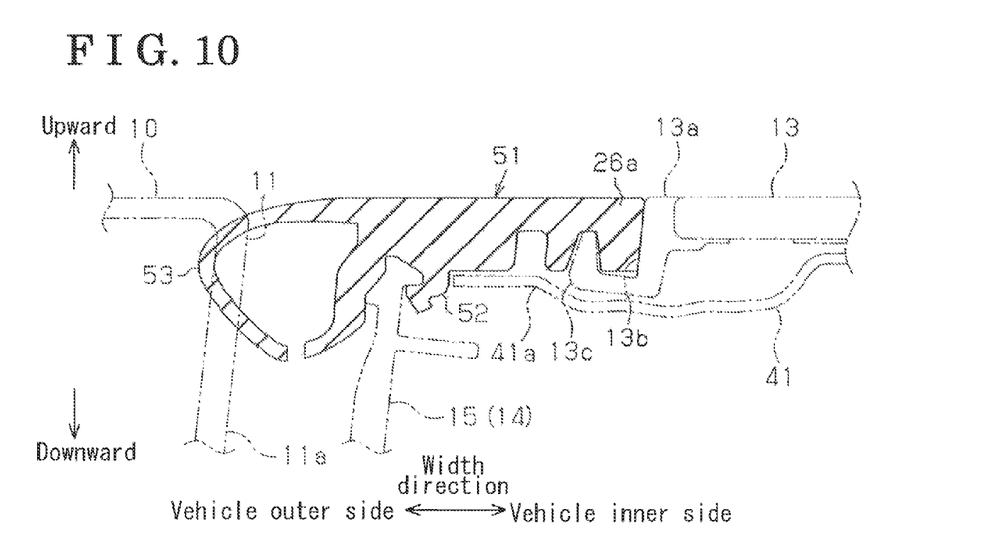
FIG. 10 is a cross-sectional view taken along a line 10-10 shown in FIG. 9.

The aforementioned embodiment may be modified as follows. According to a modified example of the embodiment shown in FIGS. 9 and 10, a die-formed connection portion 51 may be connected to the side-portion weather strip 22 so as to be replaced with a portion of the side-portion 22, the portion including an entire width of the side-portion weather strip 22 in the vehicle width direction, and the portion including the entire length of the border weather strip 25 in the front-rear direction. In those circumstances, the connection portion 51 faces and comes in close contact with the first rim portion 12a of the fully-closed movable panel 12 at the front side portion of the connection portion 51 while facing and coming in close contact with the second rim portion 13a of the fixed panel 13 at the rear side portion of the connection portion 51. The connection portion 51 includes an intermediate attachment portion 52 which corresponds to the attachment portion 31 of the embodiment and sandwiches and fits the upper portion of the wall 15. Further, the connection portion 51 includes an intermediate seal portion 53 which corresponds to the first seal portion 32 of the embodiment and liquid-tightly contacts the body-side flange portion 11a.

The roof apparatus may include a die-formed connection portion being connected to the side-portion weather strip 22 so as to be replaced with a portion of the attachment portion 31 and the second seal portion 33 of the side portion weather strip 22, the portion including the entire length of the border weather strip 25 in the front-rear direction. In those circumstances, the cross-sectional shape of the first seal portion 32 may be maintained when being positioned at the connection portion and may prevent the variance of the sealing performance between the connection portion and the body-side flange portion 11a.

According to the aforementioned embodiment, the roof apparatus does not have to include the receiving portion 41b of the base panel 41.

According to the aforementioned embodiment, the roof apparatus is provided with a gradually changed portion whose cross-sectional shape is gradually changed from the cross-sectional shape of the attachment portion 31 of the side-portion weather strip 22 to the cross-sectional shape of the seal-side engagement protrusion 25a of the border weather strip 25 and vice versa.

The roof apparatus of the aforementioned embodiment does not have to include the gradually changed portion 27 whose cross-sectional shape is gradually changed from the hollow cross section formed by the second seal portion 33 to the non-hollow cross section formed by the fourth seal portion 25c and vice versa.

According to the aforementioned embodiment, the fourth seal portion 25c of the border weather strip 25 may include a hollow cross section together with the seal-side engagement protrusion 25a.

According to the aforementioned embodiment, each of the side-portion weather strips 22 may be attached to the roof 10 via an applicable bracket.

According to the aforementioned embodiment, a front side of the front-rear portion weather strips 23 may be attached to the roof 10 via an applicable bracket.

According to the embodiment, a rear side of the front-rear portion weather strip 23 may be attached to the roof 10 via an applicable bracket, or may be attached to the fixed panel 13.

According to the aforementioned embodiment, for example, three or more panels covering the opening 11 may be arranged next to each other in the front-rear direction as long as the movable panel 12 (the first panel) and the fixed panel 13 (the second panel) may be arranged alternately in the front-rear direction. The border weather strip 25 may be positioned between the movable panel 12 and the fixed panel 13 which are positioned next to each other.

According to the aforementioned embodiment, the roof apparatus includes the plural panels (a movable panel 12 and a fixed panel 13) being positioned next to each other in the vehicle front-rear direction, the plural panels (the movable panel 12 and the fixed panel 13) configured to the roof (10) to cover the opening (11) formed on the roof (10) of the vehicle, the plural panels (the movable panel 12 and the fixed panel 13) including the first panel (the movable panel 12) for opening and closing the opening (11), the plural panels (the movable panel 12 and the fixed panel 13) including the second panel (the fixed panel 13) being positioned at the front or the rear of the vehicle and next to the first panel (the movable panel 12), the second panel (the fixed panel 13) being fixed to establish the state where the opening (11) is closed, and the weather strip (20) including the weather strip body (21) being attached to the entire periphery of the opening (11) of the roof (10), the weather strip body (21) sealing the portion between the opening rim of the opening (11) and the peripheral rim formed by the plural panels (the movable panel 12 and the fixed panel 13), the border weather strip (25) attached to the second panel (the fixed panel 13) at the border portion between the first panel (the movable panel 12) and the second panel (the fixed panel 13) which are positioned next to each other, the border weather strip (25) sealing the border portion between the first panel (the movable panel 12) and the second panel (the fixed panel 13), and the connection portion (26, 51) integrally connecting the weather strip body (21) and each opposing end of the border weather strip (25) in the vehicle width direction.

According to the aforementioned configuration, the portion between the peripheral rim of the movable panel 12 and the opening rim of the opening 11, and the border portion between the movable panel 12 and the fixed panel 13 are sealed by the single weather strip 20. Similarly, according to the aforementioned configuration, the portion between the peripheral rim of the fixed panel 13 and the opening rim of the opening 11, and the border portion between the fixed panel 13 and the movable panel 12 are sealed by the single weather strip 20. Thus, the sealing may be prevented from being cut at the entire periphery of the opening 11 including the border portion between the movable panel 12 and the fixed panel 13.

According to the aforementioned configuration, the weather strip body (21) includes the first side-portion weather strip (22) and the second side-portion weather strip (22) serving as a pair, the first side-portion weather strip (22) and the second side-portion weather strip (22) extending in the vehicle front-rear direction along the opposing rim portions of the opening (11) in the vehicle width direction, respectively. Each of the first side-portion weather strip (22) and the second side-portion weather strip (22) is made from the extruded member having the constant cross section, said each of the first side-portion weather strip (22) and the second side-portion weather strip (22) includes the attachment portion (31) configured to be attached to the roof (10), said each of the first side-portion weather strip (22) and the second side-portion weather strip (22) includes the first seal portion (32) connected to the attachment portion (31) and liquid-tightly contacts the opening rim of the opening (11), and said each of the first side-portion weather strip (22) and the second side-portion weather strip (22) includes the second seal portion (33) connected to the attachment portion (31) and liquid-tightly contacts the peripheral rim formed by the first panel (the movable panel 12) and the second panel (the fixed panel 13). The connection portion (26) connects the first side-portion weather strip (22) and the second side-portion weather strip (22) with each end of the border weather strip (25) while leaving at least the first seal portion (32).

According to the aforementioned configuration, the cross-sectional shape of the first seal portion 32 may be maintained when being positioned at the connection portion 26. Accordingly, the sealing performance may be prevented from being varied between the first seal portion 32 and the opening rim of the opening 11.

According to the aforementioned embodiment, the connection portion (26) connects the first side-portion weather strip (22) and the second side-portion weather strip (22) with said each end of the border weather strip (25) while leaving the first seal portion (32) and the attachment portion (31).

According to the aforementioned configuration, the cross-sectional shape of the attachment portion 31 in addition to the first seal portion 32 may be maintained when being positioned at the connection portion 26. The sealing performance may be prevented from being varied between the first seal portion 32 and the opening rim of the opening 11.

According to the aforementioned embodiment, the border weather strip (25) is made from the extruded member having the constant cross section. The connection portion (26) includes the gradually changed portion (27) whose cross-sectional shape is gradually changed from the cross-sectional shape of the border weather strip (25) to the cross-sectional shape of at least the second seal portion (33) and vice versa.

According to the aforementioned embodiment, the gradually changed portion 27 may prevent the cross-sectional shape of the second seal portion 33 from being changed sharply.

According to the aforementioned embodiment, the second seal portion (33) forms the hollow cross section together with the attachment portion (31) by connecting ends of the second seal portion (33) to the attachment portion (31). The border weather strip (25) includes the panel attachment portion (the seal-side engagement protrusion 25a) attached to the second panel (the fixed panel 13). The border weather strip (25) further includes the third seal portion (25b) connected to the panel attachment portion (25a) and liquid-tightly contacts the rim end of the first panel (the movable panel 12) facing the second panel (the fixed panel 13) in the vehicle front-rear direction. The border weather strip (25) further includes the fourth seal portion (25c) connected to the panel attachment portion (25a) and liquid-tightly contacts the rim end of the second panel (the fixed panel 13) facing the first panel (the movable panel 12) in the vehicle front-rear direction. The fourth seal portion (25c) forms the non-hollow cross section together with the panel attachment portion (25a) by being cantilevered by the panel attachment portion (25a). The cross-sectional shape of the gradually changed portion (29) is gradually changed from the hollow cross section formed by the second seal portion (33) to the non-hollow cross section formed by the fourth seal portion and vice versa.

According to the aforementioned embodiment, the second seal portion 33 and the fourth seal portion 25c which include different cross-sectional shapes from each other may be connected smoothly by the gradually changed portion 27.

According to the aforementioned embodiment, the second panel (the fixed panel 13) includes the base panel (41) which is made of metal and is configured to fix the second panel (the fixed panel 13) to the roof (10). The base panel (41) includes the receiving portion (41b) receiving reaction force applied to the connection portion (26) from the first panel (the movable panel 12) which is in a fully-closed state.

According to the aforementioned embodiment, the reaction force applied to the connection portion 26 from the movable panel 12 is received by the receiving portion 41b which serves as the part of the metal-made base panel 41. Accordingly, for example, the sealing performance may not be degraded due to the instability of the posture of the connection portion 26 when elastically deformed.

According to the aforementioned embodiment, the weather strip body (21) includes the first side-portion weather strip (22) and the second side-portion weather strip (22) serving as a pair, the first side-portion weather strip (22) and the second side-portion weather strip (22) extending in the vehicle front-rear direction along the opposing rim portions of the opening (11) in the vehicle width direction, respectively. Each of the first side-portion weather strip (22) and the second side-portion weather strip (22) is made from the extruded member having the constant cross section, said each of the first side-portion weather strip (22) and the second side-portion weather strip (22) includes the attachment portion (31) configured to be attached to the roof (10), said each of the first side-portion weather strip (22) and the second side-portion weather strip (22) includes the first seal portion (32) connected to the attachment portion (31) and liquid-tightly contacts the opening rim of the opening (11), and said each of the first side-portion weather strip (22) and the second side-portion weather strip (22) includes the second seal portion (33) connected to the attachment portion (31) and liquid-tightly contacts the peripheral rim formed by the first panel (the movable panel 12) and the second panel (the fixed panel 13). The connection portion (51) is connected to the first side-portion weather strip (22) and the second side-portion weather strip (22) so as to be replaced with the portion of the first side-portion weather strip (22) and the second side-portion weather strip (22), the portion including the entire width of the first side-portion weather strip (22) and the second side-portion weather strip (22) in the vehicle width direction, and the portion including the entire length of the border weather strip (25) in the vehicle front-rear direction.

According to the aforementioned embodiment, the sealing by the weather strip may be prevented from being cut.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus, comprising:
   a plurality of panels being positioned next to each other in a vehicle front-rear direction, the plurality of panels configured to a roof to cover an opening formed on the roof of the vehicle;
   the plurality of panels including a first panel for opening and closing the opening, the plurality of panels including a second panel being positioned at a front or a rear of the vehicle and next to the first panel, the second panel being fixed to establish a state where the opening is closed; and
   a weather strip including:
   a weather strip body being attached to an entire periphery of the opening of the roof, the weather strip body sealing a portion between an opening rim of the opening and a peripheral rim formed by the plurality of panels;
   a border weather strip attached to the second panel at a border portion between the first panel and the second panel which are positioned next to each other, the border weather strip sealing the border portion between the first panel and the second panel; and
   a connection portion integrally connecting the weather strip body and each opposing end of the border weather strip in a vehicle width direction.

2. The roof apparatus according to claim 1, wherein:
   the weather strip body includes a first side-portion weather strip and a second side-portion weather strip serving as a pair, the first side-portion weather strip and the second side-portion weather strip extending in the vehicle front-rear direction along opposing rim portions of the opening in the vehicle width direction, respectively;
   each of the first side-portion weather strip and the second side-portion weather strip is made from an extruded member having a constant cross section, said each of the first side-portion weather strip and the second side-portion weather strip includes an attachment portion configured to be attached to the roof, said each of the first side-portion weather strip and the second side-portion weather strip includes a first seal portion connected to the attachment portion and liquid-tightly contacts the opening rim of the opening, and said each of the first side-portion weather strip and the second side-portion weather strip includes a second seal portion connected to the attachment portion and liquid-tightly contacts the peripheral rim formed by the first panel and the second panel; and
   the connection portion connects the first side-portion weather strip and the second side-portion weather strip with each end of the border weather strip while leaving at least the first seal portion.

3. The roof apparatus according to claim 2, wherein the connection portion connects the first side-portion weather strip and the second side-portion weather strip with said each end of the border weather strip while leaving the first seal portion and the attachment portion.

4. The roof apparatus according to claim 2, wherein
the border weather strip is made from an extruded member having a constant cross section; and
the connection portion includes a gradually changed portion whose cross-sectional shape is gradually changed from a cross-sectional shape of the border weather strip to a cross-sectional shape of at least the second seal portion and vice versa.

5. The roof apparatus according to claim 3, wherein
the border weather strip is made from an extruded member having a constant cross section; and
the connection portion includes a gradually changed portion whose cross-sectional shape is gradually changed from a cross-sectional shape of the border weather strip to a cross-sectional shape of at least the second seal portion and vice versa.

6. The roof apparatus according to claim 4, wherein
the second seal portion forms a hollow cross section together with the attachment portion by connecting ends of the second seal portion to the attachment portion;
the border weather strip includes a panel attachment portion attached to the second panel, the border weather strip includes a third seal portion connected to the panel attachment portion and liquid-tightly contacts a rim end of the first panel facing the second panel in the vehicle front-rear direction, and the border weather strip includes a fourth seal portion connected to the panel attachment portion and liquid-tightly contacts a rim end of the second panel facing the first panel in the vehicle front-rear direction;
the fourth seal portion forms a non-hollow cross section together with the panel attachment portion by being cantilevered by the panel attachment portion; and
the cross-sectional shape of the gradually changed portion is gradually changed from the hollow cross-sectional shape formed by the second seal portion to the non-hollow cross-sectional shape formed by the fourth seal portion and vice versa.

7. The roof apparatus according to claim 5, wherein
the second seal portion forms a hollow cross section together with the attachment portion by connecting ends of the second seal portion to the attachment portion;
the border weather strip includes a panel attachment portion attached to the second panel, the border weather strip includes a third seal portion connected to the panel attachment portion and liquid-tightly contacts a rim end of the first panel facing the second panel in the vehicle front-rear direction, and the border weather strip includes a fourth seal portion connected to the panel attachment portion and liquid-tightly contacts a rim end of the second panel facing the first panel in the vehicle front-rear direction;
the fourth seal portion forms a non-hollow cross section together with the panel attachment portion by being cantilevered by the panel attachment portion; and
the cross-sectional shape of the gradually changed portion is gradually changed from the hollow cross-sectional shape formed by the second seal portion to the non-hollow cross-sectional shape formed by the fourth seal portion and vice versa.

8. The roof apparatus according to claim 1, wherein
the second panel includes a base panel which is made of metal, the base panel configured to fix the second panel to the roof; and
the base panel includes a receiving portion receiving a reaction force applied to the connection portion from the first panel which is in a fully-closed state.

9. The roof apparatus according to claim 2, wherein
the second panel includes a base panel which is made of metal, the base panel configured to fix the second panel to the roof; and
the base panel includes a receiving portion receiving a reaction force applied to the connection portion from the first panel which is in a fully-closed state.

10. The roof apparatus according to claim 3, wherein
the second panel includes a base panel which is made of metal, the base panel configured to fix the second panel to the roof; and
the base panel includes a receiving portion receiving a reaction force applied to the connection portion from the first panel which is in a fully-closed state.

11. The roof apparatus according to claim 4, wherein
the second panel includes a base panel which is made of metal, the base panel configured to fix the second panel to the roof; and
the base panel includes a receiving portion receiving a reaction force applied to the connection portion from the first panel which is in a fully-closed state.

12. The roof apparatus according to claim 5, wherein
the second panel includes a base panel which is made of metal, the base panel configured to fix the second panel to the roof; and
the base panel includes a receiving portion receiving a reaction force applied to the connection portion from the first panel which is in a fully-closed state.

13. The roof apparatus according to claim 6, wherein
the second panel includes a base panel which is made of metal, the base panel configured to fix the second panel to the roof; and
the base panel includes a receiving portion receiving a reaction force applied to the connection portion from the first panel which is in a fully-closed state.

14. The roof apparatus according to claim 7, wherein
the second panel includes a base panel which is made of metal, the base panel configured to fix the second panel to the roof; and
the base panel includes a receiving portion receiving a reaction force applied to the connection portion from the first panel which is in a fully-closed state.

15. The roof apparatus according to claim 1, wherein
the weather strip body includes a first side-portion weather strip and a second side-portion weather strip serving as a pair, the first side-portion weather strip and the second side-portion weather strip extending in the vehicle front-rear direction along opposing rim portions of the opening in the vehicle width direction, respectively;
each of the first side-portion weather strip and the second side-portion weather strip is made from an extruded member having a constant cross section, said each of the first side-portion weather strip and the second side-portion weather strip includes an attachment portion configured to be attached to the roof, said each of the first side-portion weather strip and the second side-portion weather strip includes a first seal portion connected to the attachment portion and liquid-tightly contacts the opening rim of the opening, and said each of the first side-portion weather strip and the second side-portion weather strip includes a second seal portion connected to the attachment portion and liquid-tightly contacts the peripheral rim formed by the first panel and the second panel; and the connection portion is connected to the first side-portion weather strip and the second side-portion weather strip so as to be replaced with a portion of the first side-portion weather strip and the second side-portion weather strip, the portion including an entire width of the first side-portion weather strip and the second side-portion weather strip in the vehicle width direction, and the portion including an entire length of the border weather strip in the vehicle front-rear direction.

16. The roof apparatus according to claim 8, wherein
the weather strip body includes a first side-portion weather strip and a second side-portion weather strip serving as a pair, the first side-portion weather strip and the second side-portion weather strip extending in the vehicle front-rear direction along opposing rim portions of the opening in the vehicle width direction, respectively;

each of the first side-portion weather strip and the second side-portion weather strip is made from an extruded member having a constant cross section, said each of the first side-portion weather strip and the second side-portion weather strip includes an attachment portion configured to be attached to the roof, said each of the first side-portion weather strip and the second side-portion weather strip includes a first seal portion connected to the attachment portion and liquid-tightly contacts the opening rim of the opening, and said each of the first side-portion weather strip and the second side-portion weather strip includes a second seal portion connected to the attachment portion and liquid-tightly contacts the peripheral rim formed by the first panel and the second panel; and the connection portion is connected to the first side-portion weather strip and the second side-portion weather strip so as to be replaced with a portion of the first side-portion weather strip and the second side-portion weather strip, the portion including an entire width of the first side-portion weather strip and the second side-portion weather strip in the vehicle width direction, and the portion including an entire length of the border weather strip in the vehicle front-rear direction.

* * * * *